(12) United States Patent
Schranz et al.

(10) Patent No.: US 12,529,653 B2
(45) Date of Patent: Jan. 20, 2026

(54) MULTICHANNEL IR GAS SENSOR THAT IS COMPENSATED AGAINST MECHANICAL DISTURBANCES

(71) Applicant: HAMILTON MEDICAL AG, Bonaduz (CH)

(72) Inventors: Christoph Schranz, Bonaduz (CH); Dominik Novotni, Chur (CH)

(73) Assignee: HAMILTON MEDICAL AG, Bonaduz (CH)

( * ) Notice: Subject to any disclaimer, the term of this patent is extended or adjusted under 35 U.S.C. 154(b) by 1114 days.

(21) Appl. No.: 17/608,269

(22) PCT Filed: Apr. 27, 2020

(86) PCT No.: PCT/EP2020/061644
§ 371 (c)(1),
(2) Date: Nov. 2, 2021

(87) PCT Pub. No.: WO2020/225010
PCT Pub. Date: Nov. 12, 2020

(65) Prior Publication Data
US 2022/0305226 A1    Sep. 29, 2022

(30) Foreign Application Priority Data
May 3, 2019   (DE) .......................... 102019111563.9

(51) Int. Cl.
*G01N 21/3504* (2014.01)
*G01N 33/497* (2006.01)

(52) U.S. Cl.
CPC ....... *G01N 21/3504* (2013.01); *G01N 33/497* (2013.01); *A61M 2205/3313* (2013.01)

(58) Field of Classification Search
CPC ............. G01N 21/3504; G01N 33/497; A61M 2205/3313
See application file for complete search history.

(56) References Cited

U.S. PATENT DOCUMENTS

| 7,132,658 B2 | 11/2006 | Weckstrom et al. |
| 8,379,199 B2 | 2/2013 | Freese et al. |

(Continued)

FOREIGN PATENT DOCUMENTS

| CN | 103884276 A | 6/2014 |
| CN | 105973831 A | 9/2016 |

(Continued)

OTHER PUBLICATIONS

DE-10140998-A1, English Translation (Year: 2003).*

(Continued)

*Primary Examiner* — Ryan D Walsh
(74) *Attorney, Agent, or Firm* — Tollefson IP (57) ABSTRACT

A multi-channel infrared gas sensor including a beam splitter arrangement, which splits an infrared beam into four infrared partial beams, four bandpass filters and four infrared sensors, respectively one for each infrared partial beam at a first used signal wavelength. The directions of propagation of the four infrared partial beams differ from one another in pairwise fashion. A first and second infrared used signal sensor are arranged so that respective used signal sensor detection areas have a symmetric orientation with respect to a used signal sensor plane of symmetry situated between the detection areas. A first and second infrared reference signal sensor are arranged so that respective reference signal sensor detection areas have a symmetric orientation with respect to a reference signal sensor plane of symmetry situated between the reference signal sensor detection areas. No signal sensor detection area is orthogonal to its respective signal sensor plane of symmetry.

14 Claims, 5 Drawing Sheets

(56) References Cited

U.S. PATENT DOCUMENTS

| | | | |
|---|---|---|---|
| 8,586,930 | B2 | 11/2013 | Haveri et al. |
| 9,291,481 | B2 | 3/2016 | Meissner et al. |
| 9,810,624 | B2 | 11/2017 | Koop |
| 10,502,682 | B2 | 12/2019 | Dreyer et al. |
| 10,768,101 | B2 | 9/2020 | Schossig et al. |
| 2001/0015408 | A1 | 8/2001 | Stock |
| 2005/0012042 | A1 | 1/2005 | Weckstrom et al. |
| 2005/0247878 | A1 | 11/2005 | Baschant et al. |
| 2007/0241280 | A1 | 10/2007 | Dainobu et al. |
| 2010/0078563 | A1 | 4/2010 | Haveri et al. |
| 2010/0182600 | A1 | 7/2010 | Freese et al. |
| 2014/0185057 | A1 | 7/2014 | Meissner et al. |
| 2016/0030691 | A1 | 2/2016 | Berry Ann et al. |
| 2017/0052113 | A1 | 2/2017 | Koop |
| 2018/0120224 | A1 | 5/2018 | Dreyer et al. |
| 2019/0120754 | A1 | 4/2019 | Schossig et al. |
| 2022/0265945 | A1* | 8/2022 | Schranz .................... G01J 3/36 |

FOREIGN PATENT DOCUMENTS

| | | | | |
|---|---|---|---|---|
| CN | 106461543 | A | | 2/2017 |
| CN | 109416320 | A | | 3/2019 |
| DE | 10005923 | A1 | | 8/2001 |
| DE | 10140998-A1032003 | | * | 3/2003 ........... G01N 1/3504 |
| DE | 102017217859 | A1 | | 8/2018 |
| EP | 1482301 | A1 | | 12/2004 |
| EP | 2169384 | A1 | | 3/2010 |
| JP | 42-016038 | | | 5/1963 |
| JP | 2006-220582 | A | | 8/2006 |
| JP | 2007-212315 | A | | 8/2007 |
| JP | 2015-75385 | A | | 4/2015 |
| JP | 2016-517726 | A | | 6/2016 |
| JP | 2018-77222 | A | | 5/2018 |

OTHER PUBLICATIONS

German PTO Search Report for DE 102019111563.9 dated Feb. 2, 2020.
International Search Report for PCT/EP2020/061644 dated Jul. 20, 2020.
Japanese Patent Office refusal t for JP Application No. 2021-565087 dated Jan. 17, 2024.
Search report for CN2020800332570 dated Jan. 17, 2025.
Chinese Patent Office dated Feb. 29, 2024 corresponding to present application.

* cited by examiner

MULTICHANNEL IR GAS SENSOR THAT IS COMPENSATED AGAINST MECHANICAL DISTURBANCES

CROSS-REFERENCE TO RELATED APPLICATIONS

This application is the National Stage of International Application No. PCT/EP2020/061644, filed on Apr. 27, 2020, which claims the benefit of German Application No. 10 2019 111 563.9, filed on May 3, 2019. The entire contents of both applications are hereby incorporated herein by reference.

BACKGROUND OF THE INVENTION

The present invention relates to a multi-channel infrared gas sensor comprising
a beam splitter arrangement adapted to split an infrared beam incident on the beam splitter arrangement along a predetermined irradiation axis into a plurality of infrared partial beams,
a first band filter arranged in a first beam path of a first infrared partial beam and having a predetermined first bandwidth and having a transmission maximum at a predetermined first useful signal wavelength,
a first infrared useful signal sensor arranged in the first beam path of the first infrared partial beam behind the first band filter,
a second band filter which is arranged in a second beam path of a second infrared partial beam different from the first infrared partial beam, the second band filter having a predetermined second bandwidth and a transmission maximum at a predetermined first reference signal wavelength, the first reference signal wavelength being different from the first useful signal wavelength,
a first infrared reference signal sensor located in the second beam path of the second infrared partial beam behind the second band filter.

The present invention further relates to a ventilation device with such a multi-channel infrared gas sensor.

The term "infrared" is also abbreviated as IR in the present application. Likewise, the multichannel infrared gas sensor is also referred to below as a "multichannel IR gas sensor" or merely "gas sensor" for short.

A gas sensor of the type mentioned is known from US 2007/0241280 A1. It is also known from this publication to use such a gas sensor for measuring a gas component, in particular $CO_2$, in the ventilation gas of a living patient.

When artificially ventilating a living patient, whether the patient is completely sedated or comatose and therefore unable to breathe on their own, or whether the patient is merely being assisted in breathing spontaneously for at least part of the time, it is helpful and important to know the gas components of the ventilation gas in order to monitor the patient's vital functions and/or to monitor the correct operation of the ventilation device. This is well known in the relevant specialist field. For example, by recording the $CO_2$ content in the inspiratory ventilation gas and in the expiratory ventilation gas, it is possible to determine how well the patient is metabolizing oxygen. However, this is only intended to be one of several possible examples.

The gas sensor known from US 2007/0241280 A1 uses both a reflecting and transmitting beam splitter to split an infrared beam entering the beam splitter into two infrared partial beams. A first infrared partial beam is directed through a first band filter onto a first sensor. This first band filter has a transmission maximum at the infrared absorption wavelength of $CO_2$ as the useful signal wavelength and has a small first bandwidth so that the sensor signal changes as much as possible depending on the respective $CO_2$ content of the sample gas irradiated by the infrared beam entering the gas sensor. The first sensor is therefore an infrared useful signal sensor.

A second infrared partial beam is directed to a second sensor after passing through a second band filter and additionally through a notch filter. The second band filter has a transmission maximum at the infrared absorption wavelength of $CO_2$ as the reference signal wavelength and has a wider bandwidth than the first band filter. The notch filter has an extinction maximum or transmission minimum also at the infrared absorption wavelength of $CO_2$. As a result, the signal from the second sensor does not change with the change in the $CO_2$ content of the sample gas, or changes only to a negligible extent. The second sensor is consequently an infrared reference signal sensor.

The IR reference signal sensor is required to assess the extent of absorption of infrared light by $CO_2$ in the sample gas, and thus the proportion of $CO_2$ in the sample gas, by comparing the signal from the IR useful signal sensor with the signal from the IR reference signal sensor. This also applies to the present invention.

It is helpful to derive the useful signal of the IR useful signal sensor on the one hand and the reference signal of the IR reference signal sensor on the other hand from one and the same incident infrared beam to ensure that both the useful signal and the reference signal have been exposed to essentially the same disturbance factors, both qualitatively and quantitatively, so that a quantitative change in the useful signal caused only by disturbance factors also causes a corresponding change in the reference signal. This prevents a change in the useful signal from being erroneously inferred to be a change in the gas component identified by the useful signal wavelength. This also applies to the present invention.

The IR useful signal sensor and the IR reference signal sensor are arranged on the known gas sensor in such a way that their respective sensor sensing surfaces are inclined towards one another around a virtual tilt axis. In the schematic illustrations shown in US 2007/0241280 A1, the respective planar sensor sensing surfaces are oriented at an angle of 90° relative to one another. The all-around extended imaginary sensor sensing surfaces of the known gas sensor intersect in their common virtual tilt axis. The sensor sensing area of the IR useful signal sensor and the sensor sensing area of the IR reference signal sensor are arranged in mirror symmetry with respect to a symmetry plane containing the virtual tilt axis.

US 2007/0241280 A1 does not name any specific IR sensors that are used in the known gas sensor. However, there are IR sensors that are not only sensitive to irradiation of infrared light, but also sensitive to mechanical loads, such as vibrations. Such mechanically sensitive IR sensors are also mechanically sensitive depending on the direction, i.e. a mechanical load of the same amount has a different effect on one and the same IR sensor depending on the direction from which it acts on the IR sensor.

SUMMARY OF THE INVENTION

A disadvantage of the gas sensor known from US 2007/0241280 A1 is therefore that a mechanical load which acts uniformly on the gas sensor as a whole has a different effect on the IR useful signal sensor and the IR reference signal sensor and can thus cause an undesirable inaccuracy in the determination of the gas fraction of interest in the sample gas.

It is therefore the task of the present invention to improve the aforementioned gas sensor with regard to its mechanical sensitivity in such a way that it provides a higher accuracy at the same mechanical load as the gas sensor of the prior art or its sensing result can be influenced less strongly by mechanical load than the sensing result of the gas sensor of the prior art.

This task is solved according to the invention by a gas sensor of the type mentioned at the beginning, in which the beam splitter arrangement is designed to split the incoming infrared beam into at least four infrared partial beams, the multi-channel infrared gas sensor further comprising:

- a third band filter arranged in a third beam path of a third infrared partial beam, the third band filter having a predetermined third bandwidth and a transmission maximum at a predetermined second useful signal wavelength,
- a second infrared useful signal sensor located in the third beam path of the third infrared partial beam behind the third band filter,
- a fourth band filter arranged in a fourth beam path of a fourth infrared partial beam, the fourth band filter having a predetermined fourth bandwidth and a transmission maximum at a predetermined second reference signal wavelength,
- a second infrared reference signal sensor arranged in said fourth beam path of said fourth infrared partial beam behind said fourth band filter, wherein the directions of travel of said first, second, third and fourth beam paths, respectively of the infrared partial beams are different from each other in pairs, wherein each wavelength from the first and second reference signal wavelengths is different from each wavelength from the first and second useful signal wavelengths, wherein the first and second infrared useful signal sensors are arranged such that their respective useful signal sensor sensing surfaces are symmetrically oriented with respect to a useful signal sensor symmetry plane located between the useful signal sensor sensing surfaces and wherein the first and second infrared reference signal sensors are arranged such that their respective reference signal sensor sensing surfaces are symmetrically oriented with respect to a reference signal sensor plane of symmetry located between the reference signal sensor sensing surfaces, wherein no useful signal sensor sensing surface is oriented orthogonally to the useful signal sensor plane of symmetry, and wherein no reference signal sensor sensing surface is oriented orthogonally to the reference signal sensor plane of symmetry.

When the present application refers to IR sensors in general in connection with the invention, this refers to both the IR useful signal and the IR reference signal sensors. If only both IR useful signal sensors or only both IR reference signal sensors are addressed in each case, without it being important to determine the respective IR sensor pair as useful signal or reference signal sensors, the present application speaks of determination-identical IR sensors.

By splitting the infrared beam entering the beam splitter arrangement into at least four infrared partial beams, at least two infrared sensors can be used as IR useful signal sensors and at least two infrared sensors can be used as IR reference signal sensors. According to the invention, the at least two determination-identical infrared sensors are symmetrically oriented relative to each other. Thus, a mechanical load orthogonal to the symmetry plane of two determination-identical infrared sensors, i.e. to the useful signal sensor symmetry plane of the IR useful signal sensors on the one hand and to the reference signal sensor symmetry plane of the IR reference signal sensors on the other hand, can have an effect on the two symmetrically oriented IR sensors with the same or similar effective amount but opposite effective directions. By suitable switching or/and evaluation of the sensor signals of the two symmetrically oriented IR sensors, the undesired effects of the mechanical load, for example of an impact, which are equal or similar in amount but directed in opposite directions, can be used for mutual cancellation or reduction. Although each individual IR sensor provides a sensor signal that is undesirably altered by the mechanical load, the undesirable effect of the mechanical load on the signals of both determination-identical IR sensors can be reduced or even eliminated in a simple manner solely on the basis of the signals themselves. This can be achieved, for example, by forming a geometric or arithmetic mean value from the individual signals of determination-identical sensors. This applies to the IR useful signal sensors as well as to the IR reference signal sensors. Thus, compensation of the gas sensor according to the invention against mechanical interference from at least one spatial direction is possible without additional filters solely from the signals themselves due to the described orientation and arrangement of the IR sensors.

"Different in pairs" means that any two infrared partial beams selected as desired have different directions in the beam path. This may concern a section of the beam path, but preferably concerns the entire beam path of the at least four infrared partial beams after reaching the beam splitter arrangement.

By orienting the sensor sensing surfaces of determination-identical IR sensors non-orthogonally to their associated plane of symmetry, a relatively large sensor sensing surface and thus high gas sensor sensitivity can be obtained without this resulting in a gas sensor with a large base surface orthogonal to the irradiation axis. In this way, an advantageously spatially compact gas sensor can be obtained, especially for the ventilation devices mentioned below.

In the course of the present application, it will be explained how further advantageous measures can at least partially compensate for mechanical interference from other spatial directions as well, so that in the further development of the gas sensor according to the invention described above, an increasingly extensive gas sensor insensitive to mechanical interference can be obtained by simple means.

Although the gas sensor can use more than four IR partial beams, the beam splitter arrangement preferably splits the incoming infrared beam into exactly four infrared partial beams which, after passing through band filters, hit IR sensors.

It should be noted that the present invention does not require, but also does not exclude, a symmetrical arrangement of determination-identical IR sensors with respect to their axis of symmetry, but only requires a symmetrical orientation of the sensor sensing surfaces of determination-identical IR sensors with respect to their plane of symmetry. Since the effect of a mechanical load on the gas sensor depends only on the direction of action of the mechanical load, the above-mentioned symmetrical orientation of sensor sensing surfaces of determination-identical IR sensors in each case with regard to the sensor symmetry plane assigned to them is not to be understood as strictly symmetrical in the sense that an IR sensor must be opposite its determination-identical IR sensor via the sensor symmetry plane assigned to both IR sensors. It is sufficient to fulfil the orientation symmetry required here if the sensor sensing surfaces of determination-identical IR sensors are oriented symmetrically non-orthogonally to the symmetry plane assigned to them, i.e. if the sensor sensing surfaces of both determination-identical IR sensors are either arranged parallel to their symmetry plane or are arranged on different sides of the symmetry plane inclined by the same angle with respect to a common virtual tilt axis lying in the assigned symmetry plane, but in different tilt directions. The symmetrically oriented sensor sensing surfaces can be arranged offset to each other along an axis lying in the respective assigned symmetry plane.

Due to the resulting simplification of the beam guidance of the infrared partial beams after reaching the beam splitter arrangement, however, determination-identical IR sensors and their respective sensor sensing surfaces are preferably not only oriented symmetrically with respect to their assigned plane of symmetry, but are arranged symmetrically with respect to their plane of symmetry and are preferably located opposite each other across the respective plane of symmetry.

The symmetry of the orientation of determination-identical IR sensors is preferably a mirror symmetry because of the resulting simplification of the radiation guidance of the at least four infrared partial beams. Thus, the useful signal sensor and the reference signal sensor symmetry planes are preferably each mirror symmetry planes.

Preferably, the first and the second IR useful signal sensor as well as the first and the second IR reference signal sensor are each pyroelectric infrared sensors.

Pyroelectric infrared sensors usually have a coated sensor sensing surface whose coating heats up due to irradiation of infrared light. Most pyroelectric infrared sensors also have piezoelectric properties and are therefore sensitive to mechanical loads. Since the piezoelectric effects on pyroelectric infrared sensors generally only occur for mechanical load components acting orthogonally to the sensor sensing surface, but not for mechanical load components parallel to the sensor sensing surface, the preferred pyroelectric infrared sensors are mechanically sensitive as the IR sensors of the gas sensor of the present invention are directionally anisotropic.

Preferably, the IR useful signal sensors and the IR reference signal sensors are identically designed, preferably identical sensors. The determination of an IR sensor used as an IR useful signal sensor or as an IR reference signal sensor thus depends on the band filter interacting with the respective IR sensor. The wavelength of the transmission maximum of the respective band filter primarily determines whether the IR sensor arranged behind the respective band filter is an IR useful signal sensor or an IR reference signal sensor. One will choose the second and the fourth useful signal wavelengths in such a way that they do not coincide with an absorption wavelength of a gas component of the measuring gas to be measured with the gas sensor, if possible. Then the signal obtained from the IR reference signal sensors is essentially independent of the composition of the measuring gas in a desirable manner.

At least one wavelength from the first and the second useful signal wavelengths, on the other hand, is preferably selected in such a way that it coincides with an absorption wavelength of the gas component of the sample gas to be detected by the gas sensor, or is at least so close to this absorption wavelength that a change in the proportion of the gas component to be detected in the sample gas leads to a significant change in the useful signal of the IR useful signal sensors. The multi-channel LR gas sensor presented here is preferably a non-dispersive $CO_2$ or a non-dispersive NOx, in particular a non-dispersive $NO_2$ sensor.

In principle, the useful signal sensor symmetry plane and the reference signal sensor symmetry plane can coincide in an identical symmetry plane. In this case, one IR useful signal sensor and one IR reference signal sensor are located on each side of this symmetry plane. As described above, determination-identical IR sensors do not have to be directly opposite each other across the symmetry plane, but usually are because of the resulting simplicity of the beam guidance for the infrared partial beams. An advantageously spatially compact gas sensor can be obtained if the reference signal sensor symmetry plane is different from the useful signal sensor symmetry plane. Due to the resulting spatial compactness of the gas sensor with simultaneously available relatively large installation space for the arrangement of the individual IR sensors, a mutually orthogonal arrangement of the useful signal sensor symmetry plane and the reference signal sensor symmetry is particularly advantageous.

As already described above, the sensor sensing surfaces of determination-identical IR sensors can be oriented parallel to the symmetry plane assigned to them. However, this may complicate the beam steering of the four infrared partial beams onto the respective sensor sensing surfaces. It is therefore more advantageous if the first and second infrared useful signal sensors are arranged such that their respective sensor sensing surfaces are tilted towards each other about a virtual useful signal tilt axis, and if the first and second infrared reference signal sensors are arranged such that their respective sensor sensing surfaces are tilted towards each other about a virtual reference signal tilt axis different from the useful signal tilt axis.

With the described arrangement inclined towards each other, a further compensation effect can be used with the most frequently occurring piezoelectric property of an IR sensor orthogonal to its sensor sensing surface: the component of a mechanical load orthogonal to the plane of symmetry of a pair of determination-identical IR sensors can, as already described above, be compensated by mutual cancellation or at least reduction due to their signal contributions of equal or similar amount but directed in opposite directions in each of the determination-identical IR sensors. A further component of the mechanical load in the symmetry plane and orthogonal to the virtual tilt axis leads to a signal contribution of the mechanical load in both determination-identical IR sensors with the same amount and the same direction. If both the IR useful signal sensors and the IR reference signal sensors are inclined in the same way about a useful signal tilt axis and a reference signal tilt axis, respectively, and the two different tilt axes lie either in a common plane or in planes parallel to each other, the components of the signal contributions of the mechanical load in the respective symmetry plane and orthogonal to the respective tilt axis are of the same magnitude and direction for all IR sensors and occur synchronously. Thus, although each signal of each IR sensor is changed by the mechanical load, each signal of each IR sensor is changed in the same way with the same amount and at the same time, so that this influence of the mechanical load can also be considerably reduced or even completely compensated for when taking into account the reference signal and the useful signal for determining a proportion of a gas component in the sample gas.

Just as advantageously, the beam splitter arrangement can be a reflector beam splitter arrangement to minimize the installation space requirements of the gas sensor. This means that the at least four infrared partial beams are all formed by reflection of the incoming infrared beam from the reflector beam splitter arrangement in different directions. By using such a reflector beam splitter arrangement, the four infrared partial beams formed by reflection can very easily be directed to the sensor sensing surfaces from the IR useful signal sensors and the IR reference signal sensors described above, which are inclined towards each other around respective tilt axes. When using a reflector beam splitter arrangement, all infrared useful signal sensors as well as all infrared reference signal sensors can be located on one and the same side of the reflector beam splitter arrangement, for example on an incoming beam side of the beam splitter arrangement on which the incoming infrared beam is incident on the beam splitter arrangement. Thus, substantially all of the optics and sensors on the multi-channel infrared gas sensor may be arranged between an entrance aperture or window through which an infrared beam is incident on the beam splitter assembly and a support of the reflector beam splitter assembly.

The beam splitter arrangement may comprise several sub-arrays, each of which splits an infrared beam incident on it into fewer than four infrared partial beams, but which provide a total of four infrared partial beams for an incoming infrared beam. However, the reflector beam splitter arrangement preferred above may, in a simple manner, comprise a plurality of reflector bodies each having a number of differently oriented reflector surfaces, preferably one for each desired infrared partial beam. The reflector bodies can therefore be polyhedral bodies tapering along a taper axis, the side surfaces of which are reflector surfaces for the incoming infrared beam. For example, if exactly four infrared partial beams are desired, pyramidonal reflector bodies can be used, whereby preferably, because of the resulting symmetrical structure of the gas sensor, the taper axes of the pyramidonal reflector bodies are each aligned parallel to the irradiation axis.

The infrared useful signal sensors and the infrared reference signal sensors can be arranged alternately in the circumferential direction around a virtual arrangement axis with a low overall installation space requirement, but still sufficient space for the arrangement of relatively large sensor sensing areas.

A simple structure in which the above-mentioned tapered polyhedral reflector bodies can be used enables a space-saving arrangement in which the first and second infrared useful signal sensors are diametrically opposite one another with respect to the virtual arrangement axis or/and in which the first and second infrared reference signal sensors are diametrically opposite one another with respect to the virtual arrangement axis.

Then, if the virtual axis of arrangement is the irradiation axis of incidence, the gas sensor can get by with a single deflection of each of the at least four infrared partial beams with respect to the incident infrared beam. This means that the infrared beam as an information carrier is only influenced to a very small extent by the beam splitting, which enables an accurate sensing result of the gas sensor.

The most uniform possible irradiation of the IR sensors and their sensor sensing surfaces with the infrared partial beams in the sense that an infrared partial beam with essentially the same intensity is incident on each sensor sensing surface of the at least four IR sensors can be obtained by the useful signal sensor symmetry plane or/and the reference signal sensor symmetry plane containing the arrangement axis or running parallel to the arrangement axis.

Preferably, the axis of arrangement is the intersection of the useful signal sensor symmetry plane and the reference signal sensor symmetry plane.

Preferably, the determination-identical IR sensors, each symmetrically oriented with respect to a sensor symmetry plane, are oriented with respect to their sensor symmetry plane in such a way that their respective sensor sensing surface encloses with the sensor symmetry plane an angle with an amount of 45°. Thus, mechanical loads orthogonal to the sensor symmetry plane can be directly cancelled or strongly reduced by additive or subtractive signal processing of the determination-identical IR sensors. For example, the signals from determination-identical IR sensors can be processed into a common signal information by averaging. A geometric or arithmetic mean value can be formed as the mean value. If the sensor symmetry plane contains the arrangement axis, this applies to the determination-identical IR sensors oriented symmetrically with respect to the sensor symmetry plane for each mechanical load orthogonal to the arrangement axis. Therefore, preferably, both the useful signal sensor symmetry plane and the reference signal sensor symmetry plane contain the arrangement axis.

In order to achieve that both determination-identical IR sensors are loaded in the same way by a mechanical load with a component orthogonal to the respective tilt axis of the pair of determination-identical IR sensors, the useful signal tilt axis or the reference signal tilt axis can run orthogonal to the arrangement axis. Preferably, both the useful signal and the reference signal tilt axis are orthogonal to the arrangement axis so that a component of a mechanical load running parallel to the arrangement axis affects all four IR sensors synchronously, with the same amount and in the same direction. Thus it can be ensured that the reference signal provided by the two IR reference signal sensors changes in the same way and simultaneously by the component of the mechanical load running along the arrangement axis as the useful signal provided by the two IR useful signal sensors.

A mechanical load component parallel to the tilt axis or orthogonal to the array axis and parallel to the associated symmetry plane of a pair of determination-identical IR sensors usually has no effect on the signal delivered by the IR sensor pair. Thus, the gas sensor can be made almost completely insensitive to mechanical loads, i.e. independent of the direction of action of a mechanical load acting upon it.

To achieve the lowest possible number of deflections of the incoming infrared beam or the infrared partial beams resulting from it, it is advantageous if the sensor sensing surface of each infrared useful signal sensor and the sensor sensing surface of each infrared reference signal sensor is inclined towards the beam splitter arrangement.

In principle, each of the reference signal wavelengths can be thought of as being greater than each of the useful signal wavelengths or less than each of the useful signal wavelengths. In principle, both reference signal wavelengths can also be identical. However, a particularly high quality of the reference signal can be obtained if the two reference signal wavelengths are different in magnitude, because then random disturbances caused by a temporarily unexpected gas component, measuring gas, only affect one of the two IR reference signal sensors. To provide the most robust reference signal possible, the first or the second useful signal wavelength is located between the first and the second reference signal wavelength in terms of magnitude. Both useful signal wavelengths are located between the first and the second reference signal wavelength as a particular preference.

The useful signal wavelengths define gas components in the sample gas that can be detected by the gas sensor. In principle, it can be envisaged that the useful signal wavelengths differ in magnitude, although they are intended to detect the same gas component. In order to ensure that the IR useful signal sensors can optimally evaluate the infrared partial beam incident on them with regard to the absorption information transported by it, it is advantageous if the first and second useful signal wavelengths do not differ in amount by more than one third of the smaller bandwidth of the first and third bandwidth. Preferably, the first and second useful signal wavelengths are equal in magnitude. A preferred application of the gas sensor described here is the sensing of $CO_2$ in inspiratory and/or expiratory ventilation gas during mechanical ventilation of a patient. The first and second useful signal wavelengths for $CO_2$ sensing are preferably in a range between 4.25 µm and 4.28 µm. The first reference signal wavelength can be in the range of 3.90 µm to 4.0 µm, particularly preferably 3.95 µm, the second reference signal wavelength can be in the range of 4.40 µm to 4.5 µm, particularly preferably 4.45 µm.

In order to ensure that the signal from the IR useful signal sensors reacts sensitively to changes in the proportion of the gas component defined by the useful signal wavelengths, while the signal from the IR reference signal sensors should remain as constant as possible, it is advantageous if each bandwidth from the second and fourth bandwidth is smaller in terms of amount than each bandwidth from the first and third bandwidth. The second and fourth band filters can each have a bandwidth in the two-digit nanometer range and the first and third band filter can each have a bandwidth in the three-digit nanometer range. Of the second and fourth band filters, as well as of the first and third band filters, the band filter with the smaller transmission maximum wavelength can have the larger bandwidth. Bandwidths for the second and fourth band filters are preferably in a range from 50 to 99 nm, in particular in a range of 60 to 90 nm. Bandwidths for the first and third band filters are preferably in the range of 150 to 200 nm, in particular in a range of 170 to 180 nm.

Due to the advantageous orientation and arrangement of IR useful signal sensors and IR reference signal sensors, the gas sensor described above offers the fundamental possibility of making the gas sensor insensitive to external mechanical loads. An actual signal compensation of the signals used in the gas sensor can be obtained by the fact that the gas sensor comprises an evaluation device which determines a reference information from the signals of the first and the second infrared reference signal sensor, which determines a useful information from the signals of the first and the second infrared useful signal sensor, and which outputs, from a comparison of reference information and useful information, information about a proportion of a gas identified by the first or/and the second useful signal wavelength in a measurement gas irradiated with the infrared beam entering the gas sensor. The evaluation device can be realized by an integrated circuit or microchip in the gas sensor's sensor housing. However, the evaluation device can also be an external evaluation device which is arranged outside the sensor housing of the gas sensor and is in signal-transmitting line connection with the IR sensors of the gas sensor.

Particularly in artificial ventilation, the line components through which ventilation gas flows become contaminated during ventilation operation. This applies especially to the expiratory line side, which is reached by the patient's body fluids. Frequent replacement of the measuring cuvette, which can also be contaminated by moisture, saliva and the like, is therefore advantageous. In order to be able to use the gas sensor provided with expensive measuring technology with exchangeable measuring cuvettes, the gas sensor can have a sensor housing with a first compartment in which the beam splitter arrangement, the infrared useful signal sensors and the infrared reference signal sensors are arranged, and with a second compartment spatially remote from the first compartment, in which an infrared radiation source is arranged, wherein a receiving formation for receiving a measuring cuvette is arranged between the first and the second compartment. The recording formation can comprise a recording gap between the two compartments, in which a section of a measuring cuvette that can be transmitted from the second compartment to the first compartment can be recorded.

Because of the particularly advantageous applicability of the gas sensor described herein, the present invention also relates to a ventilation device for at least assisting artificial ventilation of a living patient, comprising:
  a source of ventilation gas,
  a ventilation line arrangement for conducting inspiratory ventilation gas from the ventilation gas source to a patient-side proximal ventilation gas outlet opening and for conducting expiratory ventilation gas away from a proximal ventilation gas inlet opening,
  a pressure changing device for varying the pressure of the respiratory gas in the respiratory line arrangement,
  a control device for operating the respiratory gas source or/and the pressure varying device, and
  a multi-channel infrared gas sensor as described and further illustrated above for detecting at least one gas component in the inspiratory or/and expiratory respiratory gas.

A ventilation gas source can be a ventilation gas reservoir, such as a gas cylinder, or the ventilation gas source can be a coupling formation for fluidic coupling with a house installation of a clinic, which provides ventilation gas in a line network. The ventilating gas source may also be a blower that draws ventilating gas from a ventilating gas reservoir and delivers it in the ventilating line assembly. The ventilating gas reservoir in this case may be the environment of the ventilating device from which the ventilating gas source draws ambient air.

The pressure changing device may comprise a valve, for example, for reducing the pressure of a ventilation gas expanded from the ventilation gas source.

The pressure changing device may be or comprise the previously mentioned blower. Depending on the configuration of the respiratory gas source, the respiratory gas source and the pressure changing device can thus also be formed by matching device components of two devices or by one and the same device. A measurement cuvette may carry respiratory gas which is irradiated or transilluminated with infrared by the gas sensor for detecting the presence of at least one gas component and its proportion in the measurement gas. The measurement cuvette can be a bypass measurement cuvette in which ventilation gas flows that has been branched off from the ventilation line arrangement.

Advantageously, the ventilation line arrangement comprises a measurement cuvette through which ventilation gas can flow, which forms a branch-free part of the ventilation line arrangement and can be coupled with the multichannel infrared gas sensor for infrared transmission of ventilation gas. Then the measuring cuvette is a main flow measuring cuvette which directly conducts the inspiratory ventilation gas supplied to the patient and/or the expiratory ventilation gas conducted away from the patient. Advantageously, the measuring cuvette is arranged in the ventilation line arrangement in a detachable and exchangeable manner in order to be able to replace it easily, quickly and hygienically with a functioning new measuring cuvette if it becomes dirty.

The gas sensor evaluation device described above can be part of the control device of the ventilation device.

Advantageously, the control device is designed to change one or more operating parameters of the ventilation gas source, for example if this is a blower, and/or of the pressure changing device based on the sensing results of the multi-channel infrared gas sensor.

The ventilation gas outlet port and the ventilation gas inlet port can be one and the same opening, for example at the proximal end of an endotracheal tube. However, they may also be two different openings. The ventilator may have any patient interface, such as the aforementioned endotracheal tube or a laryngeal mask or other interface suitable for artificial ventilation.

BRIEF DESCRIPTION OF THE DRAWING FIGURES

The present invention will be explained in more detail below with reference to the accompanying drawings. It shows:

FIG. 1 A schematic exploded view of a ventilation device according to the invention, FIG. 2 A roughly schematic cross-sectional view through the measuring cuvette from FIG. 1 with the multi-channel infrared gas sensor from FIG. 1 in longitudinal section, FIG. 3 A plan view of the beam splitter assembly, the four infrared sensors, and the four band filters partially obscured by the infrared sensors from FIG. 2 when viewed along the irradiation axis of incidence starting from the section plane III-III in FIG. 2, FIG. 4 A rough schematic explanation of the compensating effect of the arrangement of infrared sensors in the multichannel infrared gas sensor, and FIG. 5 An exemplary diagram with the different signal levels of the IR useful signal sensors during phases of an absorption, non-absorption and reabsorption of $CO_2$ (top) and with the signal levels of the IR reference signal sensors during the same phases.

DETAILED DESCRIPTION OF THE PREFERRED EMBODIMENTS

Figure 1:
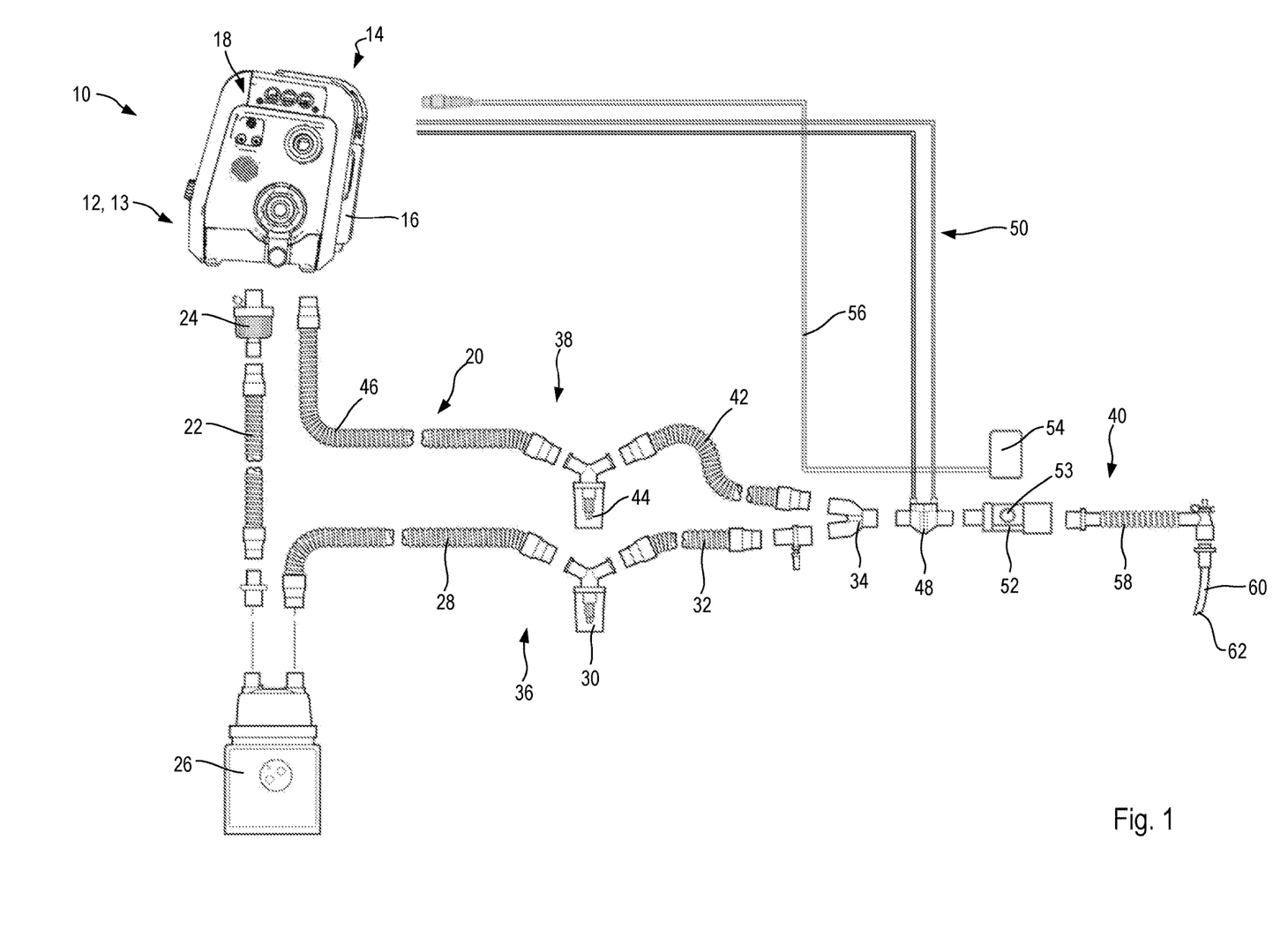

In FIG. 1, an example of a ventilation device according to the invention is generally designated 10. The ventilation device 10 includes a ventilation gas source 12 in the form of a blower and a control device 14 for setting the operating parameters for the ventilation gas source 12. The ventilation gas source 12 and the control device 14 are housed in the same housing 16. This housing also contains valves known per se, such as an inspiration valve and an expiration valve. However, these are not specifically shown in FIG. 1.

The control device 14 on the ventilator device 10 has an input/output device 18 which includes numerous switches, such as pushbuttons and rotary switches, to allow data to be input into the control device 14 if required. The delivery rate for the blower for the respiratory gas source 12 can be changed by the control device to change the amount of respiratory gas delivered by the respiratory gas source per time unit. Therefore, in the present embodiment, the ventilating gas source 12 is also a pressure changing device 13 for the ventilating device.

Connected to the ventilatory gas source 12 is a ventilatory line assembly, which in this example includes five flexible tubes. A first inspiratory ventilation tube 22 extends from a filter 24 arranged between the ventilatory gas source 12 and itself to a conditioning device 26, where the ventilatory gas delivered from the ventilatory gas source 12 is humidified to a predetermined humidity level and aerosol medications are added, if necessary. The filter 24 filters and purifies ambient air supplied by the blower as the inspiratory gas source 12.

A second inspiratory ventilation tube 28 leads from the conditioning device 26 to an inspiratory water trap 30. A third inspiratory ventilation tube 32 leads from the water trap 30 to a Y-connector 34, which connects the distal inspiratory line 36 and 10 the distal expiratory line 38 to form a combined proximal inspiratory-expiratory ventilation line 40.

From the Y-connector 34 back to the housing 16, a first expiratory ventilation tube 42 extends to an expiratory water trap 44, and from there a second expiratory ventilation tube 46 extends to the housing 16, where expiratory ventilation gas is vented into the environment through an expiratory valve not shown.

On the near-patient combined inspiratory-expiratory side of the Y-connector 34, a flow sensor 48, here: a differential pressure flow sensor 48, immediately follows the Y-connector 34 and detects the inspiratory and expiratory flow of ventilation gas towards and away from the patient. A line arrangement 50 transmits the gas pressure prevailing on both sides of a flow obstacle in the flow sensor 48 to the control device 14, which calculates the amount of inspiratory and expiratory ventilation gas flowing per unit of time from the transmitted gas pressures and in particular from the difference between the gas pressures.

In the direction away from the Y-connector 34 towards the patient, the flow sensor 48 is followed by a measuring cuvette 52 for the non-dispersive infrared sensing of a predetermined gas content in the ventilation gas. In the present example, this gas proportion is the proportion of $CO_2$ in the ventilation gas. The $CO_2$ content in the inspiratory ventilation gas as well as in the expiratory ventilation gas is of interest, since the change in the $CO_2$ content between inspiration and expiration is a measure of the metabolic capacity of the patient's lungs. FIG. 1 shows one of the lateral windows 53 through which infrared light can be emitted into or out of the measuring cuvette 52, depending on the orientation of a multi-channel infrared gas sensor 54 that is detachably coupled to the measuring cuvette.

The infrared gas sensor 54 can be coupled to the measuring cuvette 52 in such a way that the infrared gas sensor 54 can illuminate the measuring cuvette 52 with infrared light. From the intensity of the infrared light, or more precisely from its spectral intensity, the amount or proportion of a predetermined gas in the measuring gas flowing through the measuring cuvette 52 can be concluded in a manner known per se. The predetermined gas, here $CO_2$, absorbs infrared light of a defined wavelength. The intensity of the infrared light in this wavelength after passage depends essentially on the absorption of the infrared light of this wavelength by the predetermined gas. A comparison of the intensity of the infrared light of the defined wavelength with a wavelength of the infrared light that does not belong to any absorption spectrum of an expected gas fraction in the sample gas provides information about the fraction of the predetermined gas in the sample gas. The IR gas sensor 54 is therefore connected to the control device 14 of the ventilation device 10 via a data line 56 and transmits the described intensity information to the control device 14 via the data line 56.

The measuring cuvette 52 is followed in the direction of the patient by a further piece of tubing 58, on which an endotracheal tube 60 is arranged as a ventilation interface to the patient. A proximal opening 62 of the endotracheal tube 60 is both a ventilatory gas outlet opening through which inspiratory ventilatory gas is introduced into the patient through the endotracheal tube 60, and a ventilatory gas inlet opening through which expiratory ventilatory gas is returned from the patient back into the endotracheal tube 60.

Figure 2:
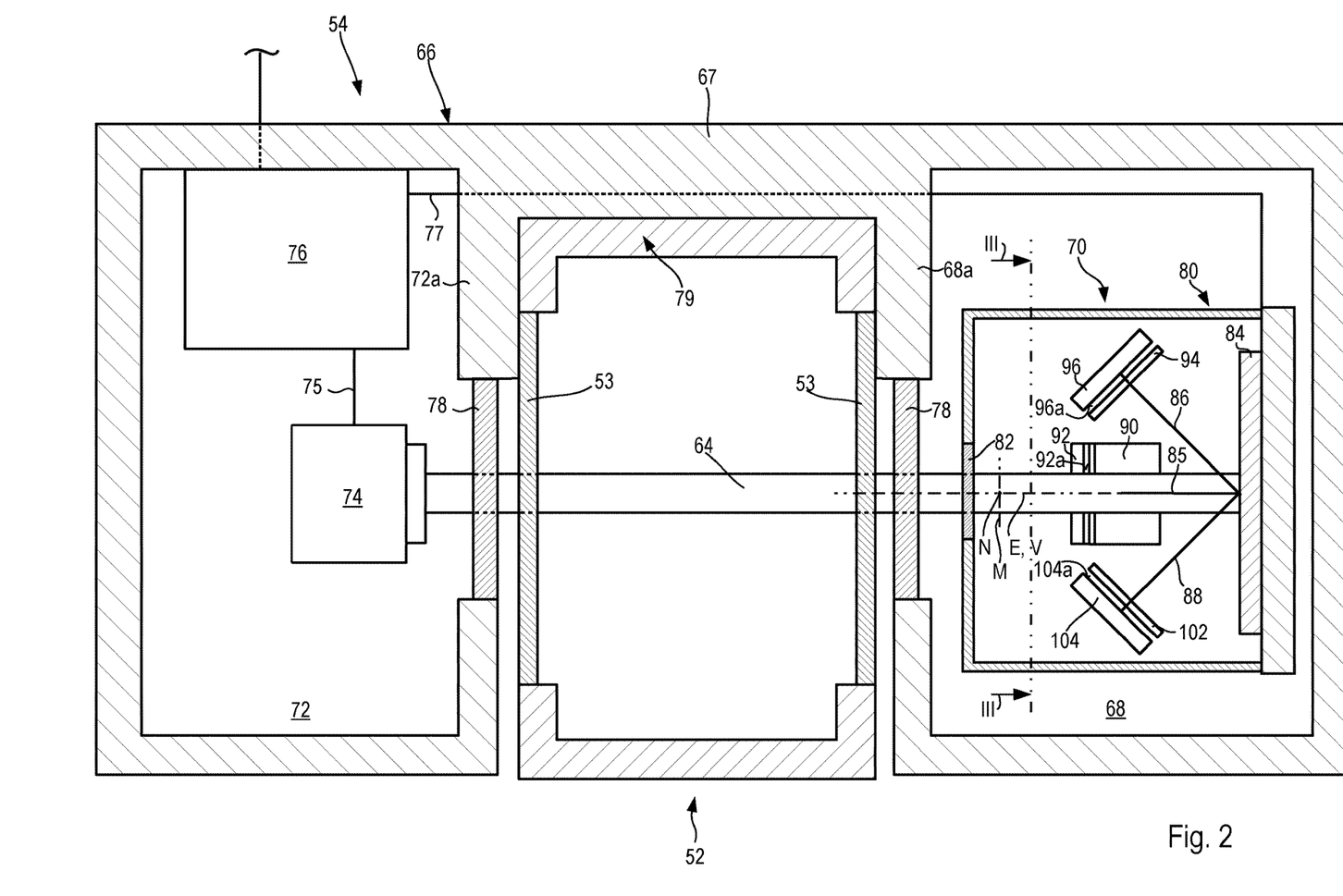

FIG. 2 shows a rough cross-section of the measuring cuvette 52 and a rough longitudinal section of the multi-channel LR gas sensor 54 coupled therein. The measurement cuvette 52 in FIG. 2 has ventilation gas flowing through it orthogonally to the drawing plane of FIG. 2. An infrared beam 64 on the gas sensor 54 runs parallel to or in the drawing plane of FIG. 2.

The gas sensor 54 comprises a sensor housing 66, in the first compartment 68 of which a sensor system 70, explained in more detail below, is arranged, and comprises a second compartment 72, in which an infrared radiation source 74 is arranged. By way of example only, an on-board sensor control device 76 is arranged in the second compartment 72, which communicates in a signal-transmitting manner with the infrared radiation source 74 and the sensor system 70 via lines 75 and 77 and which communicates in a signal-transmitting manner with the control device 14 via the data line 56. In the present example, the control device 14 on the ventilation device 10 can act as a higher-level control device for the IR gas sensor 54 and request sensing values from the sensor control device 76, which then controls the infrared radiation source 74 accordingly for operation and transmits the sensing signals detected by the sensor system 70 to the control device 14 for evaluation by the latter. Control device 14 is thus an evaluation device for the IR gas sensor 54.

The two compartments 68 and 72 are bridged by a housing bridge 67. The housing bridge 67 and the adjoining side walls 68*a* and 72*a* of the two compartments 68 and 72 form a clamping-receiving formation 79 into which the measuring cuvette 52 can be inserted and releasably clamped. The measuring cuvette 52 and the housing 66 on the gas sensor 54 can be separated from each other again simply by manually overcoming the clamping force. Additionally or alternatively, a means of latching can be provided for latching the gas sensor and the measuring cuvette 52 together.

Each of the compartments of 68 and 72 has an infrared-transmitting window 78 through which the infrared beam 64 emitted by the infrared radiation source 74 shines. Since the infrared beam 64 must pass through the measuring cuvette 52 completely, the measuring cuvette 52 has a window 53 on both sides of the flow passage it determines, which is transparent to infrared light and also traversed by the infrared beam 64. The measuring cuvette 52 is preferably mirror-symmetrical in the section received in the IR gas sensor 54 with respect to a mirror symmetry plane orthogonal to the infrared beam 64, since the direction of the radiation through the measuring cuvette 52 by the infrared beam 64 is not important. The IR gas sensor 54 can therefore also be coupled to the measuring cell 52 rotated by 180° around an axis orthogonal to the drawing plane of FIG. 2 and to the infrared beam 64, in deviation from the representation in FIG. 2.

The sensor system 70 has its own sensor system housing 80. The sensing housing 80 includes a window 82 through which the infrared beam 64 may enter the sensing housing 80 along an irradiation axis of incidence E.

After passing through the window 82, the incident infrared beam 64 encounters a beam splitter arrangement 84 which has a plurality of pyramidonal reflective bodies (not shown) and which splits a portion of the infrared beam 64 incident thereon into four infrared partial beams at angles of equal magnitude with respect to the irradiation axis E. The infrared partial beams are divided by the pyramidonal reflective bodies. Of these four infrared partial beams, two infrared partial beams each with opposite partial beam path components lie in the same partial beam plane, whereby the two partial beam planes are orthogonal to each other and, in the example shown, contain the irradiation axis E as a common intersection axis.

The second infrared partial beam 86 and the fourth infrared partial beam 88 run parallel to the drawing plane of FIG. 2. These are shown in FIG. 2. They each make an angle of about 45° with the irradiation axis E.

A first infrared partial beam 85 also extends at an angle of approximately 45° to the irradiation axis E away from the viewer of FIG. 2 to the first band filter 90 and to the first infrared useful signal sensor 92 located behind it. The first infrared partial beam 85 therefore reaches the first infrared useful signal sensor 92 only after passing through the first band filter 90. A fourth infrared partial beam 87 is not shown in FIG. 2 because it is located completely in front of the FIG. 2 drawing plane. It is shown in FIG. 3.

A second band filter 94 is located in the path of the second infrared partial beam 86 in front of the first infrared reference signal sensor 96.

Figure 3:
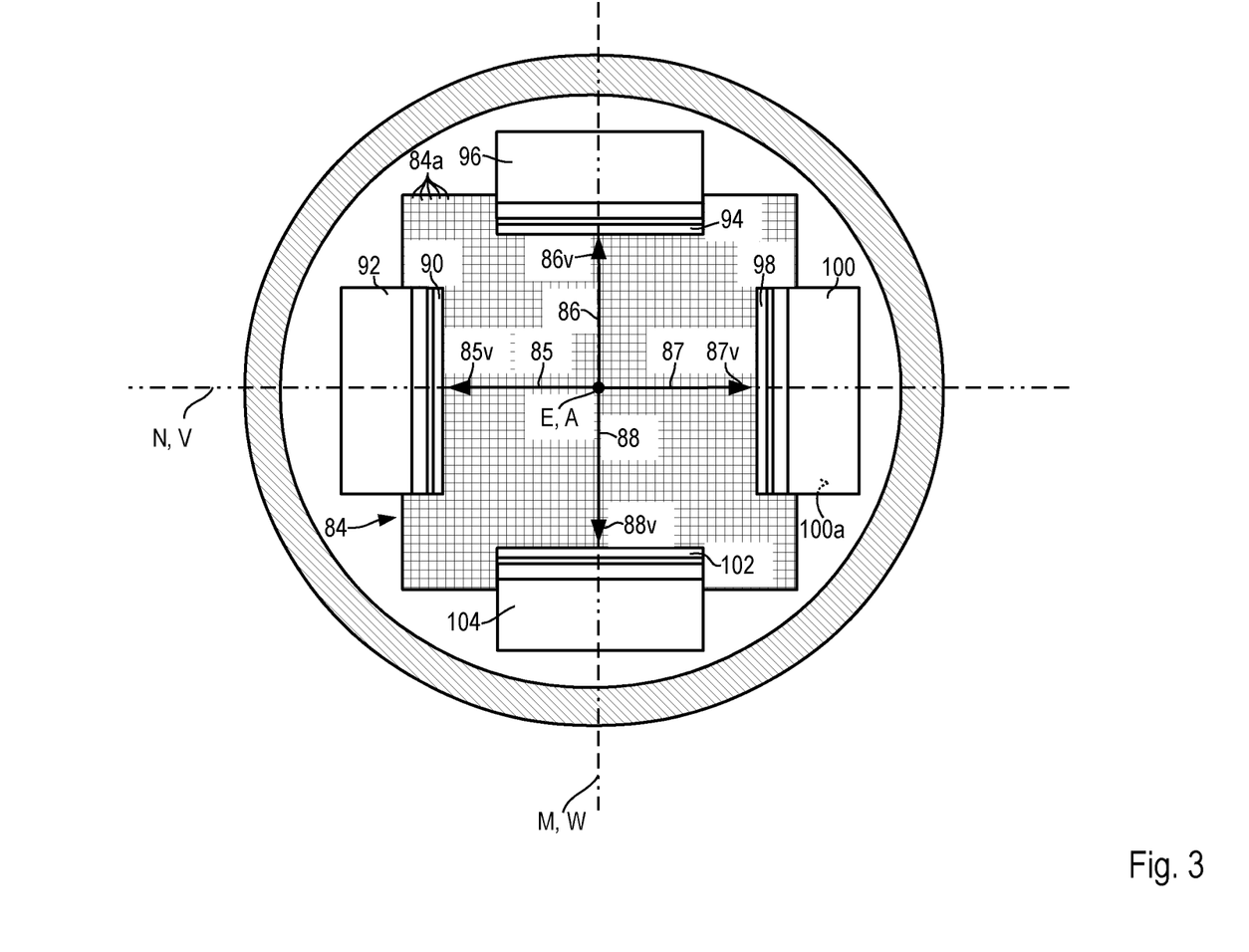

A third band filter 98, not shown in FIG. 2 because it is located in front of the FIG. 2 drawing plane, is located in the path of the third infrared partial beam 87 in front of the second infrared useful signal sensor 100 (see FIG. 3).

Finally, a fourth band filter 102 is located in the path of the fourth infrared partial beam 88 in front of a second infrared reference signal sensor 104.

The arrowheads in FIG. 3 indicate the different paired directions 85*v*, 86*v*, 87*v* and 88*v* of the first through fourth infrared partial beams 85, 86, 87 and 88 and their paths, respectively.

The first and third band filters 90 and 98 respectively have a transmission maximum in the range of the absorption wavelengths of $CO_2$, approximately in a range between 4.25 and 4.28 µm. Their bandwidths are in the range of 170 to 180 nm.

The second and the fourth band filters 94 and 102, respectively, have a transmission maximum in the range outside the absorption wavelengths of $CO_2$, for instance in the range of 3.90 to 4.0 µm, and/or in the range of 4.40 to 4.5 µm. Their bandwidths are in the range of 60 to 90 nm.

The IR sensors 92, 96, 100 and 104 are preferably identical in construction. They are pyroelectric IR sensors that are piezoelectrically sensitive orthogonal to their respective sensor sensing surface 92*a*, 96*a* and 104*a*. This also applies to the second IR useful signal sensor 98, but its sensor sensing surface 100*a* is only shown in FIG. 3. The sensor sensing surfaces 92*a*, 96*a*, 100*a* and 104*a* on the IR sensors 92, 96, 100 and 104 are flat.

The sensor sensing surfaces 96*a* and 104*a* on the first and second IR reference signal sensors 96 and 104, respectively, are inclined to each other by 90° around a tilt axis N orthogonal to the drawing plane of FIG. 2. The sensor sensing surfaces 96*a* and 104*a* thus face each other as well as the beam splitter arrangement 84. The first and second IR reference signal sensors 96 and 104, respectively, are oriented in mirror symmetry with respect to a reference signal sensor symmetry plane V orthogonal to the drawing plane of FIG. 2 and containing the irradiation axis E and the tilt axis N. The same applies to the first and second IR useful signal sensors 92 and 98, respectively, but their useful signal sensor symmetry plane W is parallel to the drawing plane of FIG. 2. However, it also contains the irradiation axis E. The tilt axis M, about which the sensor sensing surface 92a of the first IR useful signal sensor and the sensor sensing surface 100a of the second IR useful signal sensor 100 are tilted relative to each other by approximately 90°, lies with the tilt axis N in a common plane orthogonal to the irradiation axis E and includes a right angle with the tilt axis N.

In other words, in the embodiment, the tilt axis N and the irradiation axis E span the plane of symmetry V and the tilt axis M and the irradiation axis E span the plane of symmetry W, as can be seen in FIG. 3.

The IR reference signal sensors 96 and 104 oriented symmetrically with respect to the plane of symmetry V and their associated band filters 94 and 102 are mirror-symmetrical with respect to the plane of symmetry W. Likewise, the IR useful signal sensors 92 and 100 oriented symmetrically with respect to the plane of symmetry W, as well as their associated band filters 90 and 98, are arranged mirror-symmetrically with respect to the plane of symmetry V.

As shown in FIG. 3, the IR sensors 92, 96, 100 and 104 are arranged alternately at an equal angular distance of 90° around the arrangement axis A coinciding with the irradiation axis E. An IR useful signal sensor is always followed by an IR reference signal sensor in a direction of rotation around the arrangement axis A and vice versa.

The sensor sensing surface 100a, which is not visible in FIG. 2, is marked in FIG. 3.

The small squares in the beam splitter arrangement 84 symbolize the pyramidonal reflection bodies 84a arranged in rows and columns, the pyramid axis of which is parallel to each other and to the irradiation axis E.

Figure 4:
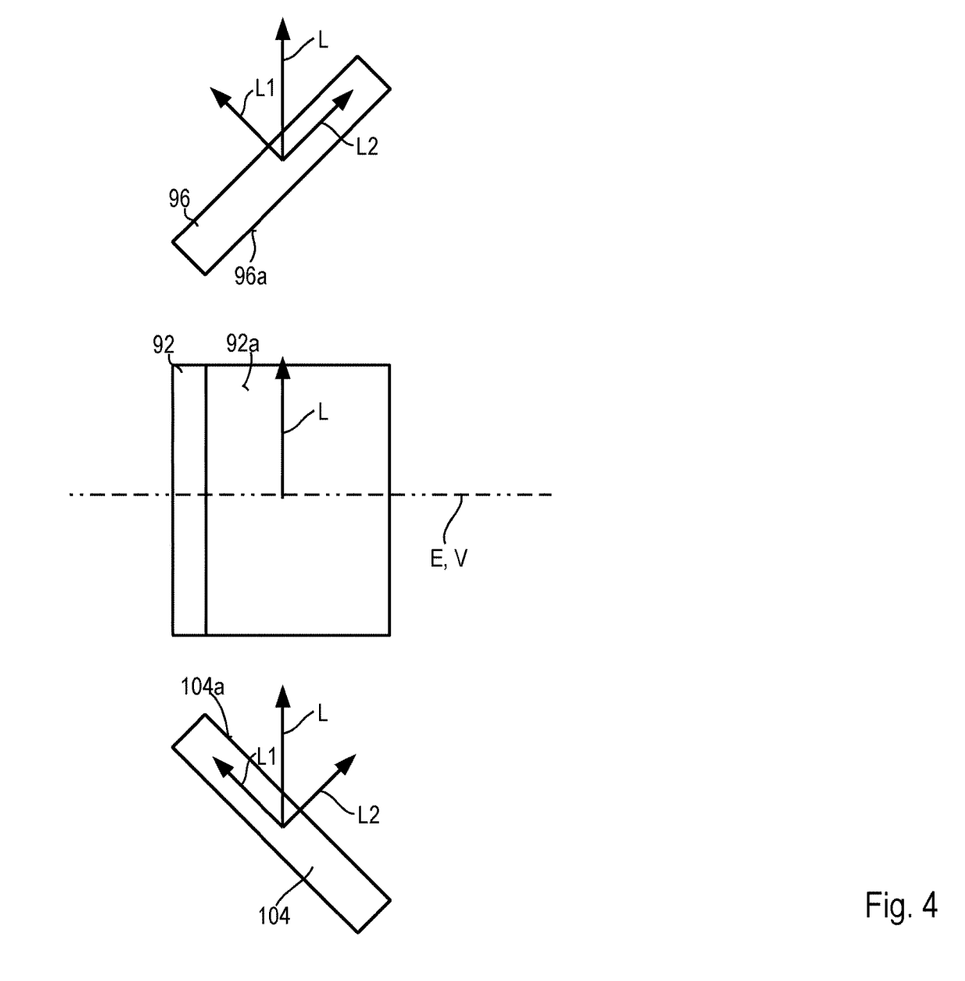

FIG. 4 shows the effect of a mechanical load on the sensor system 70. Assume a mechanical impact load L which acts parallel to the drawing plane of FIGS. 3 and 4 and thus parallel to the symmetry plane W as well as orthogonal to the irradiation axis E and thus to the arrangement axis A. The mechanical impact load L is shown on the IR sensors 92, 96 and 104 shown in FIG. 2 and repeated in FIG. 4. Due to the symmetrical orientation of the IR useful signal sensors 92 and 100, what has been said about the IR useful signal sensor 92 applies accordingly to the IR useful signal sensor 100 not shown in FIGS. 2 and 4.

The pyroelectric IR sensors 92, 96, 100 and 104 have piezoelectric sensitivity orthogonal to their sensor sensing surfaces 92a, 96a, 100a and 104a, i.e. a mechanical load with a component orthogonal to the sensor sensing surface triggers an electrical signal in the IR sensor concerned, the polarity of which depends on the direction of action of the mechanical load orthogonal to the sensor sensing surface.

The IR useful signal sensors 92 and 100 are oriented with their sensor sensing surfaces 92a and 100a parallel to the mechanical impact load L, so that the mechanical impact load L has no component orthogonal to their sensor sensing surfaces 92a and 100a. Consequently, the mechanical impact load L does not interfere with the IR sensing signal of the IR useful signal sensors 92 and 100.

At the IR reference signal sensors 96 and 104, the mechanical impact load L can be decomposed into mutually orthogonal components L1 and L2, of which component L1 is oriented orthogonally to the sensor sensing surface 96a of the first IR reference signal sensor 96 and of which component L2 is oriented orthogonally to the sensor sensing surface 104a of the second IR reference signal sensor 104. Due to the angular orientation of the sensor sensing surfaces 96a and 104a relative to the axis of arrangement A and the axis of incidence E, respectively, which are equal in amount but oppositely directed, the amounts of the mutually orthogonal components L1 and L2 are equal, but the component L1 is oppositely directed with respect to the sensor sensing surface 96a compared to the component L2 and its orientation to the sensor sensing surface 104a. The mechanical shock L therefore interferes with the actual infrared-induced sensing signal in each of the IR reference signal sensors 96 and 104 and superimposes an interference signal induced by the mechanical shock L onto it. However, the two interfering signals of the IR reference signal sensors 96 and 104 are synchronous and oppositely directed so that they can be cancelled out by appropriate signal processing, for example by signal addition of the sensing signals of the IR reference signal sensors 96 and 104. The signal from the reference signal sensors 96 and 104 is then just as free from interference as that from the useful signal sensors 92 and 100.

Since the reference signal sensor symmetry plane V and the useful signal sensor symmetry plane W intersect in the arrangement axis A and consequently both planes V and W contain the arrangement axis A, it applies to any mechanical load orthogonal to the arrangement axis A that its effects on the signal in determination-identical IR 92 and 100 on the one hand and 96 and 104 on the other hand can be cancelled or very strongly reduced by corresponding signal processing of the determination-identical sensors.

Mechanical loads or load components running along the arrangement axis A cannot be cancelled out or greatly reduced within determination-identical IR sensors. However, in the arrangement of the embodiment in which all IR sensors 92, 96, 100 and 104 are oriented relative to the axis of arrangement A with angles of equal magnitude, the disturbing influence of the load on all IR sensors is identical, so that the influence of the mechanical load on the correctness of the sensing result obtained from the signals of the gas sensor 54 with regard to the $CO_2$ content in the sample gas can be considerably reduced, since the mechanical load acting along the arrangement axis A influences the useful signal obtained from the signals of the IR useful signal sensors 92 and 100 and the reference signal obtained from the signals of the IR reference signal sensors 96 and 104 essentially synchronously, in the same amount and in the same direction. The difference between the signal levels of the IR useful signal sensors 92 and 100 on the one hand and the signal levels of the IR reference signal sensors 96 and 104 on the other hand, which is actually important for determining the absorption of infrared light, does not change or changes only to a negligible extent.

Since each mechanical load can be divided into a component parallel to the axis of arrangement A and a component orthogonal thereto, the sensor system 70 presented herein permits the extensive elimination of disturbing effects of mechanical loads acting on the sensor system 70.

Figure 5:
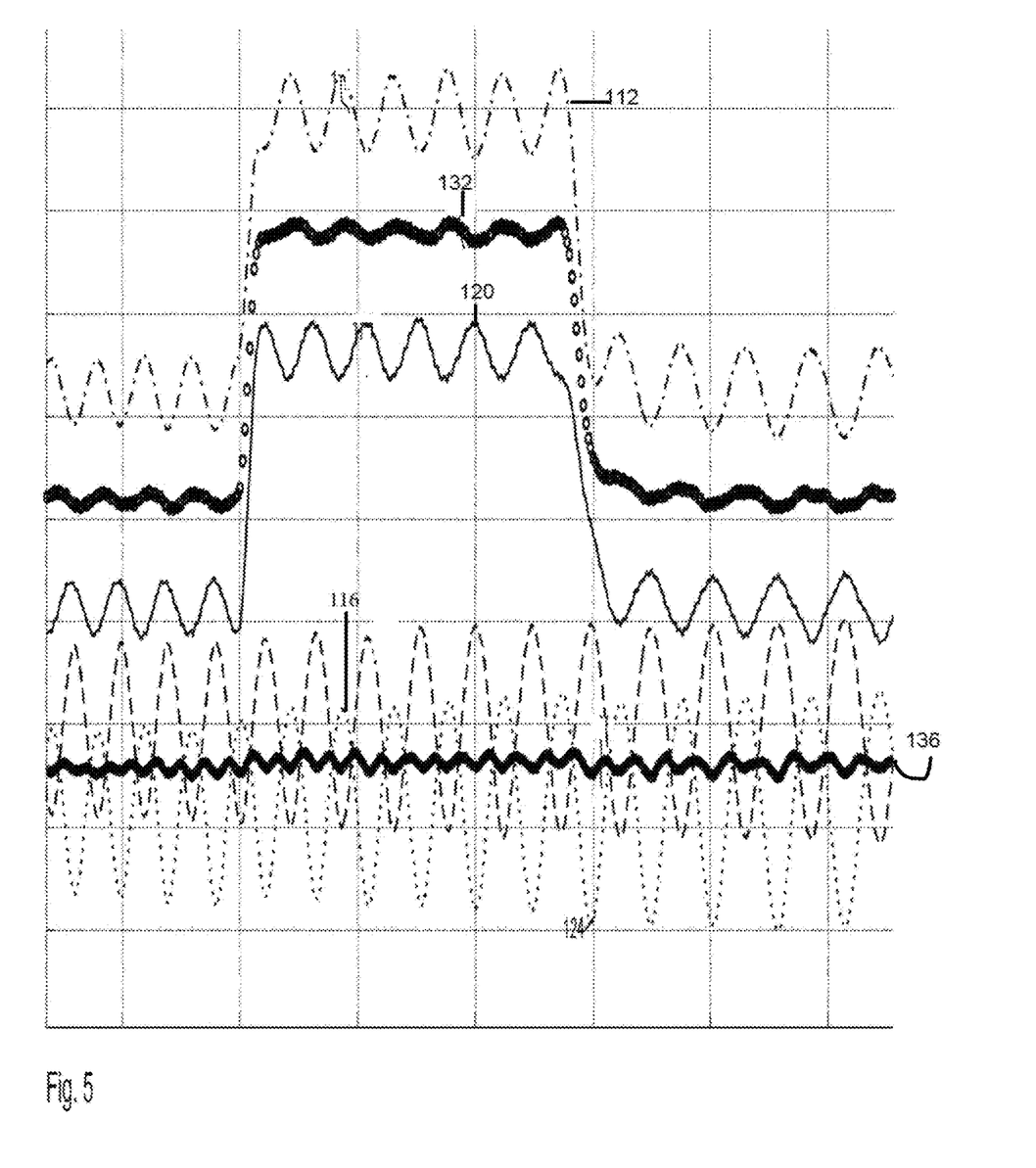

In FIG. 5, signals from the IR sensors 92, 96, 100 and 104 are plotted along the abscissa as the time axis. The ordinate of FIG. 5 indicates the level of the respective signals.

Signal 112 comes from the first IR useful signal sensor 92, signal 116 from the first IR reference signal sensor 96, signal 120 from the second IR useful signal sensor 100 and signal 124 from the second IR reference signal sensor 104.

A useful signal 132 is obtained from the signals 112 and 120, for example by averaging. A reference signal 136 is obtained from the signals 116 and 124, for example likewise by averaging.

Although both signals 116 and 124 of the IR reference signal sensors 96 and 104 are each disturbed by mechanical stress, which can be seen from the periodic oscillation of the respective signal level, the reference signal 136 resulting therefrom is hardly influenced by the mechanical stress. The same applies to the signals 112 and 120 of the IR useful signal sensors 92 and 100 and the useful signal 132 obtained therefrom in relation thereto.

In FIG. 5, the signals 112 and 120 originating from the IR useful signal sensors 92 and 100 as well as the useful signal 132 formed therefrom initially have a low level, which is due to absorption of infrared light of the infrared beam 64 by a $CO_2$ content in the measuring gas in the measuring cuvette 52. This is followed by a signal with a higher level, in which less $CO_2$ is present in the sample gas of the measuring cuvette 52 and therefore less infrared light is absorbed in the wavelength range of the band filters 90 and 98. This phase with a higher level is followed by another phase with lower levels of the signals 112 and 120 and consequently also of the useful signal 132. The signals of FIG. 5 do not originate from a real ventilation situation, but are obtained from an experimental set-up in the laboratory.

Likewise, the mechanical load of the IR sensors 92, 96, 100 and 104, which leads to the individual oscillating signals 112, 116, 120 and 124, is induced by a vibration table. It does not correspond to any stochastic-random mechanical load of a real medical use of the gas sensor 54.

The invention claimed is:

1. A multi-channel infrared gas sensor comprising:
a beam splitter assembly adapted to split an infrared beam incident on the beam splitter assembly along a predetermined irradiation axis into a plurality of infrared partial beam,
a first band filter arranged in a first beam path of a first infrared partial beam and having a predetermined first bandwidth and having a transmission maximum at a predetermined first useful signal wavelength,
a first infrared useful signal sensor arranged in the first beam path of the first infrared partial beam behind the first band filter,
a second band filter arranged in a second beam path of a second infrared partial beam different from the first infrared partial beam, the second band filter having a predetermined second bandwidth and a transmission maximum at a predetermined first reference signal wavelength, the first reference signal wavelength being different from the first useful signal wavelength,
a first infrared reference signal sensor located in the second beam path of the second infrared partial beam behind the second band filter,
wherein the beam splitter arrangement is adapted to split the incoming infrared beam into at least four infrared partial beams, the multi-channel infrared gas sensor further comprising:
a third band filter which is arranged in a third beam path of a third infrared partial beam, the third band filter having a predetermined third bandwidth and a transmission maximum at a predetermined second useful signal wavelength,
a second infrared useful signal sensor located in the third beam path of the third infrared partial beam behind the third band filter,
a fourth band filter arranged in a fourth beam path of a fourth infrared partial beam, the fourth band filter having a predetermined fourth bandwidth and a transmission maximum at a predetermined second reference signal wavelength,
a second infrared reference signal sensor arranged in the fourth beam path of the fourth infrared partial beam behind of the fourth band filter,
wherein the directions of the first, second, third and fourth beam paths are different from each other in pairs, each of the first and second reference signal wavelengths being different from each of the first and second useful signal wavelengths, the first and second useful infrared signal sensors are arranged such that their respective useful signal sensor sensing surfaces are symmetrically oriented with respect to a useful signal sensor symmetry plane located between the useful signal sensor sensing surfaces, and wherein the first and second infrared reference signal sensors are arranged such that their respective reference signal sensor sensing surfaces are symmetrically oriented with respect to a reference signal sensor symmetry plane located between the reference signal sensor sensing surfaces, wherein no useful signal sensor sensing surface is oriented orthogonally to the useful signal sensor symmetry plane and wherein no reference signal sensor sensing surface is oriented orthogonally to the reference signal sensor symmetry plane; and
wherein the first infrared useful signal sensor and the second infrared useful signal sensor are arranged such that their respective sensor sensing surfaces are tilted towards each other about a virtual useful signal tilt axis, and the first infrared reference signal sensor and the second infrared reference signal sensor are arranged such that their respective reference sensor sensing surfaces are tilted towards each other about a virtual reference signal tilt axis different from the useful signal tilt axis.

2. The multi-channel infrared gas sensor according to claim 1,
wherein the useful signal sensor symmetry plane and the reference signal sensor symmetry plane differ from one another.

3. The multi-channel infrared gas sensor according to claim 1,
wherein the beam splitter assembly is a reflector beam splitter assembly and that all infrared useful signal sensors as well as all infrared reference signal sensors are located on an irradiation side of the beam splitter assembly on which an infrared beam entering the gas sensor is incident on the beam splitter assembly.

4. The multi-channel infrared gas sensor according to claim 3,
wherein the infrared useful signal sensors and the infrared reference signal sensors are arranged alternately in the circumferential direction about a virtual arrangement axis.

5. The multi-channel infrared gas sensor according to claim 4,
wherein at least one of the following: the first or the second infrared useful signal sensor are diametrically opposite to one another with respect to the virtual arrangement axis and in that the first and the second infrared reference signal sensor are diametrically opposite to one another with respect to the virtual arrangement axis.

6. The multi-channel infrared gas sensor according to claim 4,
wherein the virtual arrangement axis is the irradiation axis.

7. The multi-channel infrared gas sensor according to one of claim 4,
wherein at least one of the following: the useful signal sensor symmetry plane (W) or the reference signal sensor symmetry plane contains the arrangement axis or runs parallel to the arrangement axis.

8. The multi-channel infrared gas sensor according to claim 1,
wherein the sensor detecting surface of each useful infrared signal sensor and the sensor sensing surface of each reference infrared signal sensor is inclined towards the beam splitter arrangement.

9. The multi-channel infrared gas sensor according to claim 1,
wherein at least one of the following: the first or the second useful signal wavelength are quantitatively located between the first and the second reference signal wavelength.

10. The multi-channel infrared gas sensor according to claim 1,
wherein the first and second useful signal wavelengths differ in amount by no more than one third of the smaller of the first and third bandwidths.

11. The multi-channel infrared gas sensor according to claim 1,
wherein the gas sensor comprises an evaluation device which determines, from the signals of the first and the second infrared reference signal sensor, reference information, which determines, from the signals of the first and the second infrared useful signal sensor, useful information, and which outputs, from a comparison of reference information and useful information, information about a proportion of a gas identified by at least one of the following:
the first or the second useful signal wavelength in a measurement gas irradiated with the incoming infrared beam.

12. The multi-channel infrared gas sensor according to claim 1,
wherein the gas sensor comprises a sensor housing having a first compartment in which the beam splitter arrangement, the infrared useful signal sensors and the infrared reference signal sensors are arranged, and with a second compartment which is spatially remote from the first compartment and in which an infrared radiation source is arranged, wherein a receiving formation for receiving a measuring cuvette is arranged between the first and the second compartment.

13. A ventilator for at least assisting artificial respiration of a living patient, comprising:
a source of respiratory gas,
a ventilation line arrangement for conducting inspiratory ventilation gas from the ventilation gas source to a patient-side proximal ventilation gas outlet opening and for conducting expiratory ventilation gas away from a proximal ventilation gas inlet opening,
a pressure changing device for changing the pressure of the ventilation gas in the ventilation line arrangement,
a control device for operating at least one of the following: the ventilation gas source or the pressure changing device, and
a multi-channel infrared gas sensor for detecting at least one gas constituent in at least one of the following: the inspiratory or expiratory ventilation gas, said multi-channel infrared gas sensor comprising a beam splitter assembly adapted to split an infrared beam incident on the beam splitter assembly along a predetermined irradiation axis into a plurality of infrared partial beam, a first band filter arranged in a first beam path of a first infrared partial beam and having a predetermined first bandwidth and having a transmission maximum at a predetermined first useful signal wavelength, a first infrared useful signal sensor arranged in the first beam path of the first infrared partial beam behind the first band filter, a second band filter arranged in a second beam path of a second infrared partial beam different from the first infrared partial beam, the second band filter having a predetermined second bandwidth and a transmission maximum at a predetermined first reference signal wavelength, the first reference signal wavelength being different from the first useful signal wavelength, a first infrared reference signal sensor located in the second beam path of the second infrared partial beam behind the second band filter, wherein the beam splitter arrangement is adapted to split the incoming infrared beam into at least four infrared partial beams, the multi-channel infrared gas sensor further comprising a third band filter which is arranged in a third beam path of a third infrared partial beam, the third band filter having a predetermined third bandwidth and a transmission maximum at a predetermined second useful signal wavelength, a second infrared useful signal sensor located in the third beam path of the third infrared partial beam behind the third band filter, a fourth band filter arranged in a fourth beam path of a fourth infrared partial beam, the fourth band filter having a predetermined fourth bandwidth and a transmission maximum at a predetermined second reference signal wavelength, a second infrared reference signal sensor arranged in the fourth beam path of the fourth infrared partial beam behind of the fourth band filter, wherein the directions of the first, second, third and fourth beam paths are different from each other in pairs, each of the first and second reference signal wavelengths being different from each of the first and second useful signal wavelengths, the first and second useful infrared signal sensors are arranged such that their respective useful signal sensor sensing surfaces are symmetrically oriented with respect to a useful signal sensor symmetry plane located between the useful signal sensor sensing surfaces, and wherein the first and second infrared reference signal sensors are arranged such that their respective reference signal sensor sensing surfaces are symmetrically oriented with respect to a reference signal sensor symmetry plane located between the reference signal sensor sensing surfaces, wherein no useful signal sensor sensing surface is oriented orthogonally to the useful signal sensor symmetry plane and wherein no reference signal sensor sensing surface is oriented orthogonally to the reference signal sensor symmetry plane; and
wherein the first infrared useful signal sensor and the second infrared useful signal sensor are arranged such that their respective sensor sensing surfaces are tilted towards each other about a virtual useful signal tilt axis, and the first infrared reference signal sensor and the second infrared reference signal sensor are arranged such that their respective reference sensor sensing surfaces are tilted towards each other about a virtual reference signal tilt axis different from the useful signal tilt axis.

14. The ventilation device according to claim 13, wherein the multi-channel infrared gas sensor is a gas sensor wherein the first and second useful signal wavelengths differ in amount by no more than one third of the smaller of the first and third bandwidths, wherein the evaluation device is part of the control device on the ventilation device.

* * * * *